C. A. BASORE.
PROCESS FOR THE PRODUCTION OF ALCOHOL FROM GAS CONTAINING ETHYLENE.
APPLICATION FILED SEPT. 2, 1921.
Reissued Oct. 25, 1921. 15,211.
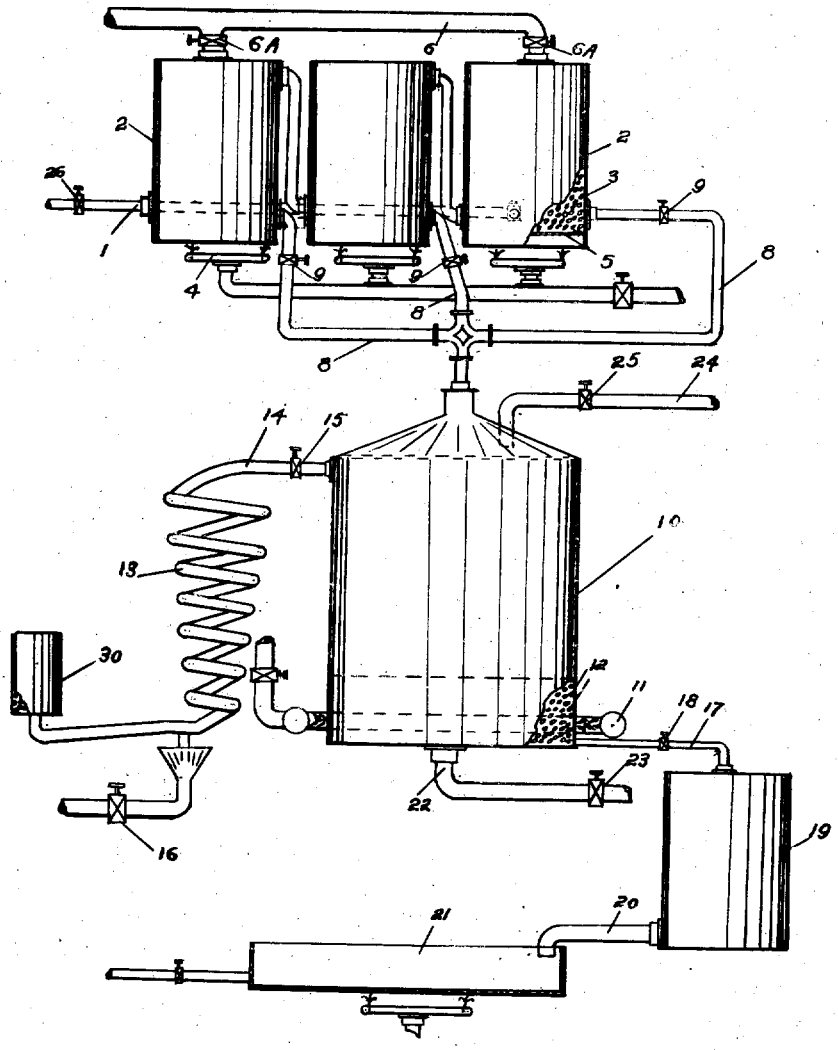
INVENTOR
Cleburne A. Basore
BY
R. S. Thurston
ATTORNEY

UNITED STATES PATENT OFFICE.

CLEBURNE A. BASORE, OF AUBURN, ALABAMA.

PROCESS FOR THE PRODUCTION OF ALCOHOL FROM GAS CONTAINING ETHYLENE.

15,211. Specification of Reissued Letters Patent. Reissued Oct. 25, 1921.

Original No. 1,385,515, dated July 26 1921, Serial No. 452,285, filed March 14, 1921. Application for reissue filed September 2, 1921. Serial No. 498,161.

*To all whom it may concern:*

Be it known that I, CLEBURNE A. BASORE, a citizen of the United States of America, residing at Auburn, in the county of Lee and State of Alabama, have invented certain new and useful Improvements in Processes for the Production of Alcohol from Gas Containing Ethylene, of which the following is a specification.

This invention relates to a novel process for the production of alcohol from by-product coke oven gas or other gas containing ethylene, the tar, ammonia and light oil of which has primarily been removed during the plant process in which gas is made.

My invention contemplates the preliminary treatment of the gas so as to remove therefrom the hydrogen sulfid, water and preferably the carbon dioxid and it is then scrubbed by causing it to bubble through hot concentrated sulfuric acid to produce ethyl hydrogen sulfate as a resultant compound in the scrubbers while the gases pass off to the service mains for commercial use, practically unaffected by the removal therefrom of the ethylene. The ethyl hydrogen sulfate is then admixed with a predetermined and definite quantity of water, which is restricted to the proportions necessary for the contemplated reactions and no more. The resultant mixture is then subjected to heat in a suitable closed apparatus which will maintain for a predetermined length of time the requisite temperature conditions for the uniting of the oxygen and hydrogen in the water with the $C_2H_5$ of the ethyl hydrogen sulfate to form alcohol and when this reaction is substantially complete, which requires approximately one hour, the resultant product is distilled and condensed in any well known manner and the alcohol recovered, the extent to which it is diluted being controlled and limited by the control of the volume of water added to the ethyl hydrogen sulfate.

One distinctive feature of my invention relates to the length of time provided for the reaction in which the alcohol is formed, which length of time is preferably obtained under proper conditions by heating the mixture of water and ethyl hydrogen sulfate in a closed vessel under a temperature preferably ranging between 100° and 120° C. In my experiments I have found that the reaction in which the OH from the water unites with $C_2H_5$ in the ethyl hydrogen sulfate to produce $C_2H_5OH$ (alcohol) is one that develops rather slowly and to obtain the maximum production of alcohol it is essential that this reaction shall have ample time to proceed to a finish. Bearing in mind that it must be conducted in the presence of heat, I have concluded that the most practical way to complete the reaction is in a vessel where the desired temperature conditions can be maintained indefinitely, should it be necessary. I have determined by experiment that the reaction under a temperature of approximately 110° C. is ordinarily completed in from 50 to 60 minutes. When the reaction has been thus completed the final step of distillation and condensation for the recovery of the alcohol and for the recovery of the sulfuric acid for reuse in the scrubbers, can proceed in any well known manner. As a result of the control of the reaction in question, I am enabled to obtain the maximum alcohol output from the original constituents.

Another distinctive feature of my invention is based upon the control and definite limitation of the volume of water added to the ethyl hydrogen sulfate. Heretofore it has been attempted to treat ethyl hydrogen sulfate with steam, and alcohol to a limited extent has been obtained in this manner, but the process has never gone into general use because the requisite time for the completion of the reaction was not provided for and there was no control or limitation of the volume of water added in the form of steam and as a result of the latter fact the relatively small volume of alcohol recovered was greatly diluted, as was also the residual sulfuric acid, and the condensing and concentration of the alcohol and the concentration of the acid involved additional expense and trouble, whereas by my process a definite volume of water, which may vary in the limits between 50 and 70 per cent. of the combined volume of ethyl hydrogen sulfate and sulfuric acid, is added. Usually 60 per cent. in volume of water to the other elements, will produce the most satisfactory operating results.

I have also discovered that when the degree of concentration of the ethyl hydrogen sulfate in the scrubbers is permitted to exceed 30 per cent. by weight of the sulfuric acid in the scrubbers, then the subsequent dilution and treatment of such concentrated ethyl hydrogen sulfate in the closed vessel will produce ether in substantial quantity which will increase as the concentration of the ethyl hydrogen sulfate increases. I prefer to draw off the acid and ethyl hydrogen sulfate for my proposed treatment when the ethyl hydrogen sulfate reaches a concentration of between 10 per cent. and 20 per cent. by weight of the sulfuric acid.

In describing my process from the initial stage, utilizing by-product coke oven gas free from tar, ammonia and light oil, as a source of ethylene, reference is made to the drawings which illustrate a typical apparatus to which this gas, in accordance with well known practice, after being freed of its hydrogen sulfid, water and preferably its carbon dioxid, is presented in heated condition (60° to 70° centigrade) through a pipe or conduit 1 and enters either end scrubber of a series of scrubbers 2 which are charged with concentrated sulfuric acid and filled with broken particles 3 of inert matter such as coke, rock, etc. The gas which is under pressure is caused to bubble up through the tanks passing therethrough in series and the tanks are heated by any suitable burner equipment 4 or by superheated steam in chamber 5. The principal of counter-currents is used in the scrubbing. From the final scrubber the coke oven gas, freed of its ethylene, passes through the conduit 6 from the end scrubber of the series under control of its respective valve 6ª to the service main, while the ethyl hydrogen sulfate formed by absorption of ethylene in concentrated hot sulfuric acid (66 Bé. preferably heated to 70° to 80° C.) is drawn off from the first scrubber, or any combination as first and second, through one of the pipes 8 and conducted past a valve 9 in each pipe 8 into a heating vessel 10 which is typically illustrated and may be of any suitable type. After drawing the ethyl hydrogen sulfate and sulfuric acid from a scrubber, the latter is then refilled with acid and made the last of the series. This heating vessel is preferably heated by side burners 11 currounding the same opposite the liquid level therein and has a small amount of broken glass or inert particles 12 therein. These particles and the side burners are especially employed for preventing the foaming of the reacting liquids in the apparatus. A condensing coil 13 is connected by a pipe 14 to the top of the vessel 10 and is controlled by a valve 15. This condenser coil discharges into a collecting funnel 16 which is adapted to collect the recovered alcohol. A pipe 17 is used to conduct the sulfuric acid from the vessel 10 under control of valve 18 into filter 19, whence the liquid passes by a pipe 20 to an evaporating pan 21. Superheated steam for the purpose of steaming residual sulfuric acid is supplied to the vessel 10 by means of a pipe 22 under control of valve 23, and water is supplied to said vessel through pipe 24 under control of valve 25.

When the ethyl hydrogen sulfate has reached the desired degree of concentration in the sulfuric acid (10% to 20% by weight thereof) it is ready for treatment in the heating vessel 10 and it is delivered thereto through one or more pipes 8 by opening their respective valves 9, the valves 15, 18, 23 and 25 being previously closed and the valves 9 being closed after the admission of the ethyl hydrogen sulfate and sulfuric acid. The water in volume approximately 60 per cent. of the volume of ethyl hydrogen sulfate and sulfuric acid is then supplied through water pipe 24 and the burner 11 is lighted and the refluxing treatment commences and is continued for approximately 60 minutes under temperatures of the liquid ranging from 100° to 120° C., during which treatment the liquids within the apparatus are being continuously volatilized and condensed and the reaction is proceeding in accordance with the following equation:—

$$C_2H_5HSO_4+HOH=C_2H_5OH+H_2SO_4.$$

The uniting of OH with $C_2H_5$ to form alcohol takes place slowly and hence is best accomplished in a closed heating apparatus for the requisite time before commencing the distilling and condensing operations. At the completion of the reaction, valve 15 to the coil is opened and the vapors, consisting of alcohol, water and some sulfur dioxid, pass through the coil and the alcohol and water are condensed until all of the available alcohol is recovered. The sulfur dioxid gas, largely uncondensed, may be used for removal of the hydrogen sulfid from the raw gas, $$2H_2S+SO_2=2H_2O+3S,$$

or it can be recovered by absorption in a water tank 30 or by liquefaction. After this live steam can be admitted through pipe 22 in sufficient volume to conagulate the colloids in the remaining sulfuric acid and the latter can then be drained off through the filter and thereby relieved of its foreign matter except the water which is removed in the evaporating mechanism 21. The resultant product is substantially pure acid. The alcohol with its surplus water content and sulfur dioxid is then treated in any well known manner for the elimination of the water and sulfur dioxid and the resultant product is pure commercial alcohol.

I have also found that the successful operation of the process is dependent upon the slow and uniform feed of the gases to the scrubbers, any suitable regulating means, as valve 26, being provided to feed it slowly enough to effect the substantial removal of the ethylene in the scrubbers. Care should also be taken to keep the concentration of ethyl hydrogen sulfate in the sulfuric acid in the scrubbers below 30 per cent. by weight to the end that the percentage may not rise high enough to produce ether. While the figures which I have given for volume of water added and for the time of the reaction in the heating apparatus 10 are those which my experiments have found to be most satisfactory, it is, nevertheless, to be understood that these may be varied within the scope of my invention and with approximate results proportionate to the departure from those figures and proportions which I have found most suitable.

This application is a continuation in part of my application Serial No. 417,224, filed October 15th, 1920.

Having thus described my invention, what I claim as new and desire to secure by Letters Patent, is:—

1. The hereindescribed process for the production of ethyl alcohol from a mixture of sulfuric acid and ethyl hydrogen sulfate, which consists in adding to said mixture water in excess of 50 per cent. of the volume of said mixture, subjecting the resultant reacting constituents to heat in a closed vessel, then distilling off the alcohol and water, and finally condensing the alcohol.

2. The hereindescribed process for the production of ethyl alcohol from a mixture of sulfuric acid and ethyl hydrogen sulfate, which consists in adding to said mixture water in amount equal to from 50 per cent. to 70 per cent. of the volume of the said mixture, subjecting the resultant reacting constituents to heat in a closed vessel, then distilling off the alcohol and water, and finally condensing the alcohol.

3. The hereindescribed process for the production of ethyl alcohol from a mixture of sulfuric acid and ethyl hydrogen sulfate, which consists in adding to said mixture water in amount equal to approximately 60 per cent. of the volume of the said mixture, subjecting the resultant reacting constituents to heat in a closed vessel, then distilling off the alcohol and water, and finally condensing the alcohol.

4. The hereindescribed process for the production of ethyl alcohol from a mixture of sulfuric acid and ethyl hydrogen sulfate, which consists in adding to said mixture water in excess of 50 per cent. of the volume of said mixture, subjecting the resultant reacting constituents to heat in a vessel to continuously volatilize and recondense them therein until the combination of $C_2H_5HSO_4$ with HOH is substantially complete, then distilling off the alcohol and water, and finally condensing the alcohol.

5. The hereindescribed process for the production of ethyl alcohol from a mixture of sulfuric acid and ethyl hydrogen sulfate, which consists in adding to said mixture water in excess of 50 per cent. of the volume of said mixture, subjecting the resultant reacting constituents to heat in a vessel to continuously volatilize and recondense them therein for approximately 60 minutes, then distilling off the alcohol and water, and finally condensing the alcohol.

6. The hereindescribed process for the production of ethyl alcohol from a mixture of sulfuric acid and ethyl hydrogen sulfate, which consists in adding to said mixture water in amount approximately equal to 60 per cent. of the volume of the said mixture, subjecting the resultant reacting constituents to heat in a vessel to continuously volatilize and recondense them therein for approximately 60 minutes, then distilling off the alcohol and water, and finally condensing the alcohol.

7. The hereindescribed process for the production of alcohol from gas containing ethylene, which consists in treating the gas with hot concentrated sulfuric acid 66 Bé. 70° to 80° C. to form ethyl hydrogen sulfate not in excess of 30 per cent. in weight of the acid in the mixture, adding to the ethyl hydrogen sulfate and sulfuric acid a volume of water approximately 60 per cent. of their combined volume, treating the resultant compound in a closed heating apparatus until the reaction involving the uniting of the hydroxyl radical with the $C_2H_5$ in the ethyl hydrogen sulfate to form alcohol is practically completed, then distilling off and condensing the alcohol.

8. The hereindescribed process for the production of alcohol ethylene bearing gas free of tar, ammonia and light oil, hydrogen sulfid, water, and preferably carbon dioxid, which consists in treating the gas with hot concentrated sulfuric acid 66 Bé. 70° to 80° C. until the concentration of ethyl hydrogen sulfate in the sulfuric acid has reached a degree of from 10 per cent. to 20 per cent. by weight of the acid in said mixture, drawing off the ethyl hydrogen sulfate and sulfuric acid from the scrubbers, admixing with the latter an amount of water approximately 60 per cent. of the volume of the ethyl hydrogen sulfate and sulfuric acid, subjecting the reacting mixture to heat of from 100° to 120° C. for approximately an hour in a vessel adapted to continuously volatilize and recondense it therein, and then distilling off and condensing the alcohol, substantially as described.

9. The hereindescribed process for the production of ethyl alcohol from a mixture of sulfuric acid and ethyl hydrogen sulfate, which consists in adding water to said mixture in volume not less than 50 per cent. of the volume of the mixture, holding the resultant mixture under heat in a vessel until the combination of $C_2H_5HSO_4$ with HOH is substantially complete, and then distilling off and condensing dilute alcohol.

10. The hereindescribed process for the production of ethyl alcohol from a mixture of sulfuric acid and ethyl hydrogen sulfate, which consists in adding water to said mixture in volume between 50 and 70 per cent. of the volume of the mixture, holding the resultant mixture under heat until the hydroxyl radical has combined with the $C_2H_5$ radical, and then distilling off and condensing dilute alcohol.

11. The hereindescribed process for the production of ethyl alcohol from a mixture of sulfuric acid and ethyl hydrogen sulfate in which the latter is less than 30 per cent. by weight of the former, which consists in adding water to said mixture in volume not less than 50 per cent. of the volume of the mixture, holding the resultant mixture under heat in a vessel until the combination of $C_2H_5HSO_4$ with HOH is substantially complete, and then distilling off and condensing dilute alcohol.

In testimony whereof I affix my signature.

CLEBURNE A. BASORE.

Witness:

NOMIE WELSH.